(12) United States Patent
Cempura et al.

(10) Patent No.: US 7,802,341 B2
(45) Date of Patent: Sep. 28, 2010

(54) WIPER SYSTEM HAVING A PIN-STYLE WIPER ARM AND WIPER ASSEMBLY

(75) Inventors: Walter Cempura, Waterford, MI (US); Kyle Moll, Oxford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 1009 days.

(21) Appl. No.: 11/585,531

(22) Filed: Oct. 24, 2006

(65) Prior Publication Data

US 2008/0092320 A1 Apr. 24, 2008

(51) Int. Cl.
B60S 1/40 (2006.01)
B60S 1/38 (2006.01)

(52) U.S. Cl. ............ 15/250.32; 15/250.43; 15/250.201; 15/250.351

(58) Field of Classification Search .............. 15/250.32, 15/250.351, 250.352, 250.201, 250.43, 250.44
See application file for complete search history.

(56) References Cited

U.S. PATENT DOCUMENTS

| | | | | |
|---|---|---|---|---|
| 2,799,887 A | 7/1957 | Nemic | | 15/255 |
| 2,814,820 A | 12/1957 | Elliott et al. | | 15/245 |
| 2,937,393 A | 5/1960 | Brueder | | 15/245 |
| 3,037,233 A | 6/1962 | Peras et al. | | 15/250.42 |
| 3,056,991 A | 10/1962 | Smithers | | 15/250.41 |
| 3,082,464 A | 3/1963 | Smithers | | 15/250.42 |
| 3,088,155 A | 5/1963 | Smithers | | 15/250.42 |
| 3,089,174 A | 5/1963 | Bignon | | 15/250.36 |
| 3,234,578 A | 2/1966 | Golub et al. | | 15/250.42 |
| 3,296,647 A | 1/1967 | Gumbleton | | 15/250.04 |
| 3,317,946 A | 5/1967 | Anderson | | 15/250.42 |
| 3,350,738 A | 11/1967 | Anderson | | 15/250.42 |
| D211,570 S | 7/1968 | Tomlin | | D14/6 |
| 3,418,679 A | 12/1968 | Barth et al. | | 15/250.36 |
| 3,448,482 A * | 6/1969 | Close | | 15/250.04 |
| 3,618,155 A | 11/1971 | Mower | | 15/250.42 |
| 3,665,544 A | 5/1972 | Sakamoto | | 15/250.42 |
| 3,673,631 A | 7/1972 | Yamadai et al. | | 15/250.42 |
| 3,685,086 A | 8/1972 | Froehlich | | 15/250.2 |
| 3,862,465 A | 1/1975 | Ito | | 15/250.42 |
| 3,879,793 A | 4/1975 | Schlegel | | 15/250.42 |

(Continued)

FOREIGN PATENT DOCUMENTS

DE 10335393 A1 9/2004

(Continued)

Primary Examiner—Gary K Graham
(74) Attorney, Agent, or Firm—Bliss McGlynn, P.C.

(57) ABSTRACT

A wiper system including a wiper arm having a pivot end, attachment member and an elongate body. The attachment member includes a deck, a tab, wall plate, and a pin that extends transversely relative to the tab. The tab and the wall plate depend from the deck to define a channel. The deck extends along an inclined plane to maximize downward force of air current applied to the deck to reduce wind lift. The system further includes a wiper assembly having a wiping element, an elongated beam and a carrier. The carrier has sidewalls that define a track to receive the elongated beam and further includes a coupler to releasably engage the attachment member. The coupler includes a bore to receive the pin and a saddle to engage the channel. The saddle includes first and second guide surfaces to limit the rotational movement of the wiper assembly about the pin.

27 Claims, 2 Drawing Sheets

U.S. PATENT DOCUMENTS

| | | | | |
|---|---|---|---|---|
| 4,309,790 A | 1/1982 | Bauer et al. | ............... | 15/250.42 |
| D267,939 S | 2/1983 | Duvoux | ..................... | D12/155 |
| D268,020 S | 2/1983 | Duvoux | ..................... | D12/155 |
| 4,400,845 A | 8/1983 | Noguchi et al. | ........... | 15/250.42 |
| 4,422,207 A | 12/1983 | Maiocco et al. | ........... | 15/250.42 |
| 4,438,543 A | 3/1984 | Noguchi et al. | ........... | 15/250.42 |
| 4,464,808 A | 8/1984 | Berry | ...................... | 15/250.2 |
| 4,547,925 A | 10/1985 | Blackborow et al. | ...... | 15/250.42 |
| 4,561,143 A | 12/1985 | Beneteau | ................. | 15/250.42 |
| 4,570,284 A | 2/1986 | Verton | ..................... | 15/250.42 |
| 4,590,638 A | 5/1986 | Beneteau | ................. | 15/250.42 |
| 4,741,071 A | 5/1988 | Bauer et al. | ............... | 15/250.42 |
| 4,766,636 A | 8/1988 | Shinpo | ..................... | 15/250.42 |
| 4,782,547 A | 11/1988 | Mohnach | ................. | 15/250.04 |
| 4,852,206 A | 8/1989 | Fisher | ...................... | 15/250.42 |
| D307,408 S | 4/1990 | Mower et al. | .............. | D12/155 |
| D308,660 S | 6/1990 | Fisher | ....................... | D12/155 |
| D308,845 S | 6/1990 | Charet et al. | ............... | D12/155 |
| 4,976,001 A | 12/1990 | Wright | ..................... | 15/250.2 |
| 4,984,325 A | 1/1991 | Arai et al. | .................. | 15/250.42 |
| 4,989,290 A | 2/1991 | Hoshino | ................... | 15/250.42 |
| 5,042,106 A | 8/1991 | Maubray | ................... | 15/250.2 |
| 5,086,534 A | 2/1992 | Journee | .................... | 15/250.2 |
| 5,093,954 A | 3/1992 | Kuzuno | .................... | 15/250.42 |
| 5,138,739 A | 8/1992 | Maubray | .................. | 15/250.42 |
| 5,168,596 A | 12/1992 | Maubray | ................... | 15/250.2 |
| 5,170,527 A | 12/1992 | Lyon, II | .................... | 15/250.42 |
| 5,179,761 A | 1/1993 | Buechele et al. | .......... | 15/250.42 |
| 5,206,969 A | 5/1993 | Patterson et al. | .......... | 15/250.42 |
| 5,218,735 A | 6/1993 | Maubray | ................. | 15/250.42 |
| 5,228,167 A | 7/1993 | Yang | ....................... | 15/250.39 |
| 5,233,721 A | 8/1993 | Yang | ....................... | 15/250.39 |
| 5,257,436 A | 11/1993 | Yang | ........................ | 15/250.4 |
| 5,276,937 A | 1/1994 | Lan | ......................... | 15/257.01 |
| 5,283,925 A | 2/1994 | Maubray | ................... | 15/250.2 |
| 5,311,636 A | 5/1994 | Lee | .......................... | 15/250.42 |
| 5,319,826 A | 6/1994 | Mower | ..................... | 15/250.42 |
| 5,383,249 A | 1/1995 | Yang | ........................ | 15/250.42 |
| 5,392,489 A | 2/1995 | Mohnach | .................. | 15/250.42 |
| 5,454,135 A | 10/1995 | Okuya et al. | ............. | 15/250.42 |
| 5,463,790 A | 11/1995 | Chiou et al. | .............. | 15/250.29 |
| 5,509,166 A | 4/1996 | Wagner et al. | ........... | 15/250.44 |
| 6,292,974 B1 | 9/2001 | Merkel et al. | ........... | 15/250.201 |
| 6,499,181 B1 * | 12/2002 | Kotlarski | ................ | 15/250.201 |
| 6,550,096 B1 | 4/2003 | Stewart et al. | ............ | 15/250.32 |
| 6,553,607 B1 * | 4/2003 | De Block | .................. | 15/250.32 |
| 6,675,433 B1 | 1/2004 | Stewart et al. | ............ | 15/250.43 |
| 6,675,434 B1 | 1/2004 | Wilhelm et al. | ......... | 15/250.454 |
| 6,789,289 B2 * | 9/2004 | Roodt | ...................... | 15/250.32 |
| 6,836,926 B1 | 1/2005 | De Block | ................. | 15/250.43 |
| 7,281,294 B2 * | 10/2007 | Wilms et al. | ............ | 15/250.351 |
| 7,587,783 B1 * | 9/2009 | Lin | ........................... | 15/250.43 |
| 2002/0133897 A1 | 9/2002 | De Block et al. | ........ | 15/250.201 |
| 2004/0098821 A1 | 5/2004 | Kraemer et al. | ......... | 15/250.201 |

FOREIGN PATENT DOCUMENTS

| | | | |
|---|---|---|---|
| NL | 1017344 | * | 8/2002 |
| WO | WO 02/087935 A1 | | 11/2002 |
| WO | WO 2004/076251 A1 | | 9/2004 |
| WO | WO 2004/076252 A1 | | 9/2004 |

* cited by examiner

WIPER SYSTEM HAVING A PIN-STYLE WIPER ARM AND WIPER ASSEMBLY

BACKGROUND OF THE INVENTION

1. Field of the Invention

The present invention relates, generally, to windshield wiper systems. More specifically, the present invention relates to a wiper system having a pin-style wiper arm and wiper assembly that reduces the likelihood of wind lift and prevents excess rotation of the wiper assembly relative to the wiper arm.

2. Description of the Related Art

Windshield wiper systems known in the related art include a wiper assembly having a wiping element that contacts the surface to be wiped and a wiper arm that imparts a reciprocating movement to the wiper assembly across the surface to be wiped. The wiper assembly is releasably connected to the wiper arm through a coupler. Conventional windshield wiper assemblies known in the related art generally consist of two types commonly referred to as "beam blade windshield wiper assemblies" and "tournament-style windshield wiper assemblies." Tournament-style windshield wiper assemblies depend on a superstructure having a series of levers to distribute the downward force from the wiper arm across the wiping element. On the other hand, beam blade windshield wiper assemblies include an elongated, homogeneous strip forming a spring backbone or beam that is resiliently flexible. The beam is curved along a single plane that flexes to correspond to the curvature of a windshield.

Both types of windshield wiper assemblies rely on the downward force from the wiper arm to maintain contact between the wiping element and the windshield. Further, both types of windshield wiper assemblies conventionally include a coupler that is centrally disposed along the top surface of the wiper assembly such that the wiper assembly, coupler and wiper arm are stacked in a substantially vertical manner. However, such an arrangement increases the vertical profile of the wiper assembly and elevates the proximity of the wiper arm relative to the windshield, which increases drag and wind lift. Wind lift occurs when airflow underneath the windshield wiper assembly and/or wiper arm creates a lift force greater than the opposing downward forces of the wiper arm and airflow over the wiper assembly. During wind lift, the windshield wiper assembly lifts from the windshield of the vehicle, which can decrease the effectiveness of the windshield wiper assembly to clean the windshield.

As noted above, like all windshield wiper assemblies, beam blade wiper assemblies are subject to wind lift. Several methods have been employed to counter wind lift in beam blade wiper assemblies. By way of example, airfoils of various designs have been employed to provide a downward force on the windshield wiper assembly as a function of the air stream moving over the air foil. Additionally, wiper arms that utilize a pin to releasably engage the side of beam blade wiper assemblies have been employed to reduce the likelihood of wind lift. Such wiper arms are generally referred to as "pin-style wiper arms."

However, pin-style wiper arms known in the art present a greater likelihood for damage to the wiper system or windshield when the wiper arm is positioned perpendicular to the windshield, such as during maintenance, inspection, installation or replacement of the windshield or a component of the wiper system. More specifically, when a wiper arm is placed in the elevated position, conventional beam blade wiper assemblies have a tendency to rotate about the pin such that the wiping element is inverted relative to the windshield. Importantly, conventional beam blade wiper assemblies maintain this inverted position when the wiper arm is lowered toward the windshield. Thus, when the user attempts to re-establish contact with the windshield, the wiping element remains inverted or at least perpendicular relative to the windshield, and this can result in damage to the components of the wiper system and even the windshield.

Accordingly, while the wiper systems having beam blade wiper assemblies known in the art provide significant advances in the related technology, there continues to be a need in the art for improvements in wiper systems that employ beam blade wiper assemblies. Thus, there is a need in the art for a wiper system including a pin-style wiper arm and beam blade wiper assembly having improved performance at variable vehicle speeds to reduce that likelihood of wind lift. There is also a need in the art for a wiper system including a pin-style wiper arm and beam blade wiper assembly that prevents excess rotation therebetween, thereby reducing the likelihood of damage to the components of the wiper system and windshield during inspection, maintenance, replacement, and installation of the wiper system or windshield.

SUMMARY OF THE INVENTION

The present invention overcomes many limitations and disadvantages in the related art in wiper systems, as well as pin-style wiper arms and beam blade wiper assemblies. To this end, the wiper system of the present invention includes a wiper arm having a pivot end operatively engaged to a drive assembly of a wiper system and an attachment member. The wiper arm further includes an elongate body disposed between the attachment member and the pivot end. The attachment member includes a deck extending axially from the elongate body, a tab, a wall plate and a transversely extending pin relative to the tab. The tab and the wall plate depend from the deck substantially parallel to each other and cooperate with the deck to define a channel. The deck cooperates with the wall plate to define a leading edge and further cooperates with the tab to define a trailing edge. The deck extends from the leading edge toward the trailing edge along an inclined plane relative to the horizontal axis of the transversely extending pin to maximize downward force of air current applied to the deck, thereby reducing the likelihood of wind lift of the wiper assembly during operational movement of the system across a surface to be wiped. The wiper system further includes a wiper assembly having a wiping element adapted to contact a surface to be wiped. The wiper assembly further includes an elongated beam operatively attached to the wiping element and a carrier adapted to facilitate releasable connection to the wiper arm. The carrier has opposed first and second sidewalls that cooperate to define a track to operatively receive a portion of the elongate beam. The carrier further includes a coupler integrated within the first sidewall to releasably engage the attachment member of the wiper arm. The attachment member includes a bore adapted to operatively receive the transversely extending pin and saddle adapted to be operatively disposed within the channel. The saddle includes first and second guide surfaces adapted to limit the rotational movement of the wiper assembly about the transversely extending pin to provide releasable connection between the wiper arm and wiper assembly.

Thus, one advantage of the present invention is that the wiper system includes a beam blade wiper assembly that releasably connects to a pin-style wiper arm, where the wiper arm includes an elongate body and attachment member having an angled deck to provide improved wind lift resistance and maximize downward force to the beam blade wiper assembly.

Another advantage of the present invention is that the wiper system includes a beam blade wiper assembly having a carrier that includes a contoured top surface to efficiently utilize the air current flowing over the system to maximize downward force applied to a wiper assembly, thereby reducing the likelihood of wind lift to a beam blade wiper assembly during operational movement of the system across a surface to be wiped.

Still another advantage of the present invention is that it provides a beam blade wiper assembly having a coupler that includes a saddle that prevents excess rotation of the wiper assembly about the transversely extending pin of a wiper arm, thereby reducing the likelihood of damage to the surface to be wiped as well as components of a wiper system during maintenance, inspection or replacement of the surface to be wiped or the wiper assembly.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
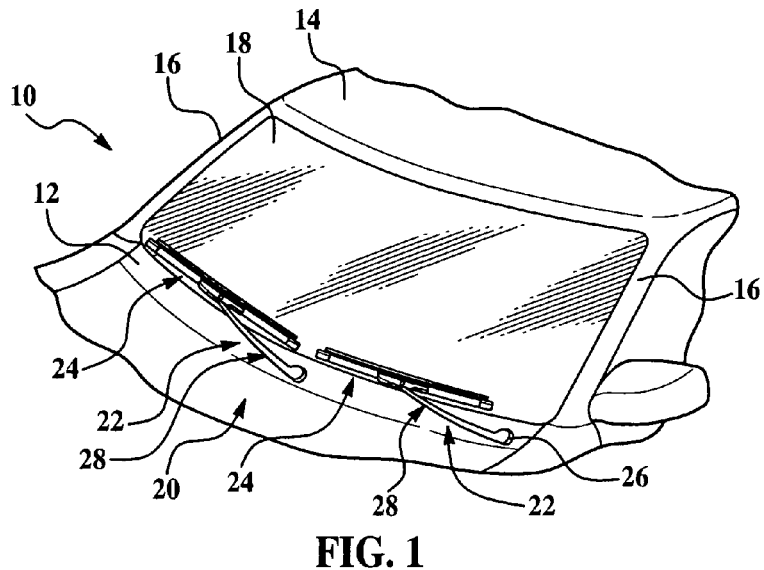
FIG. 1 is a partial perspective view of the front of an automotive vehicle having a pair of windshield wiper assemblies pivotally mounted to wiper arms for reciprocal movement across the windshield of the vehicle in accordance with the present invention

Referring now to the figures, where like numerals are used to designate like structure, a portion of a vehicle is schematically illustrated at 10 in FIG. 1. The vehicle includes a cowl 12, a roof 14, and a pair of laterally spaced front or "A" pillars 16 extending between the roof 14 and the cowl 12. The A-pillars, roof, and cowl cooperate to define a generally rectangular opening in which supports a curved or "swept back" glass windshield 18.

A wiper system is generally indicated at 20 in FIG. 1 and is employed to clean the glass windshield 18. The wiper system 20 includes wiper arms of the present invention, generally indicated at 22 and beam blade wiper assemblies of the present invention, generally indicated at 24, which correspond to the driver and passenger side of the vehicle 10. An electrical motor (not shown but generally known in the art) is employed to power the wiper system 20 and a drive assembly (not shown but generally known in the art) is employed to direct the wiper assemblies 24, via the wiper arms 22, across the windshield 18 in an oscillating manner.

Those having ordinary skill in the art will appreciate that while the wiper arms 22 and wiper assemblies 24 illustrated in FIG. 1 are shown in connection with the front windshield 18 of the vehicle 10, wiper arms 22 and wiper assemblies 24 of the present invention may be employed in other areas of a vehicle 10, such as a rear window (not shown) or a head lamp (not shown) that employs a wiper system 20. Thus, it will be understood that the present invention is not limited for use solely in connection with a vehicle's windshield 18, but for use in all applications where wiper arms 22 and wiper assemblies 24 are employed.

Referring to FIG. 1, the wiper arm 22 includes a pivot end 26 that is pivotally attached to the drive assembly (not shown) of the wiper system 20 and an elongate body 28. The elongate body 28 is operatively attached to the pivot end 26 and extends transversely therefrom toward the wiper assembly 24. More specifically, the elongate body 28 is operatively attached to the pivot end 26 in a hinged manner to enable a person to elevate the elongate body 28 away from the proximate relation to the surface to be wiped. Articulation between the pivot end 26 and elongate body 28 in this manner is conventionally known to enable maintenance or inspection of the wiper system 20 and/or windshield 18 as well as for removal and installation of wiper assemblies 24. Those having ordinary skill in the art will appreciate that the wiper arm 22 may further include a biasing member (not shown) to impart a downward force through the wiper arm 22 and onto the wiper assembly 24 to facilitate contact between the wiper assembly 24 and the windshield 18 of the vehicle 10. By way of example, the biasing member may include a spring. It should further be appreciated that the elongate body 28 of the wiper arm 22 may include a cavity adjacent to the pivot end 26 to operatively receive the biasing member.

Figure 2:
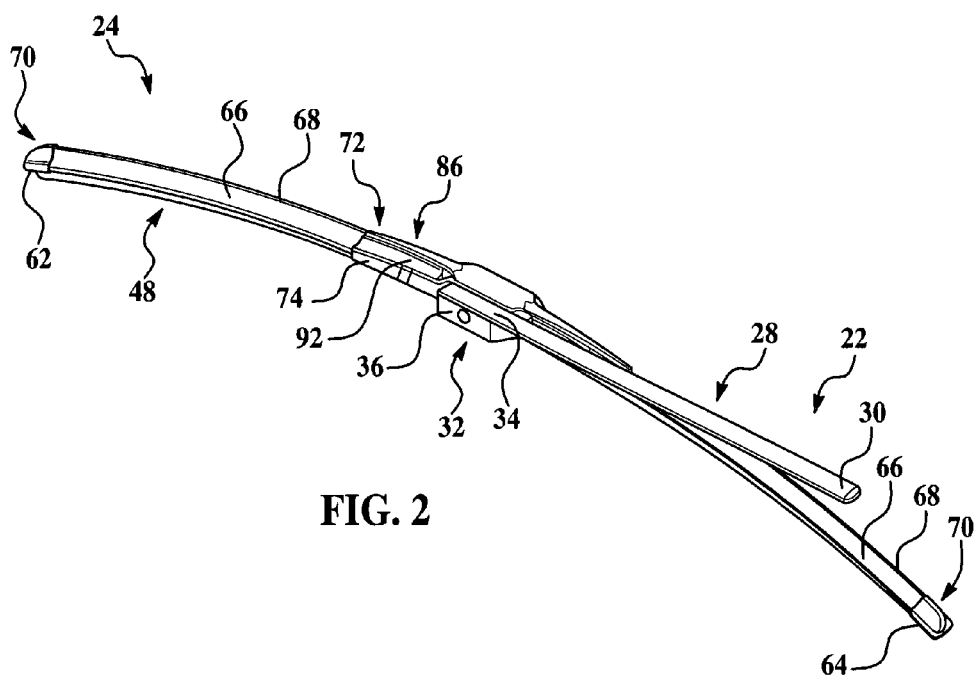
FIG. 2 is a partial perspective view of the wiper arm and wiper assembly in accordance with the present invention.
Figure 5:
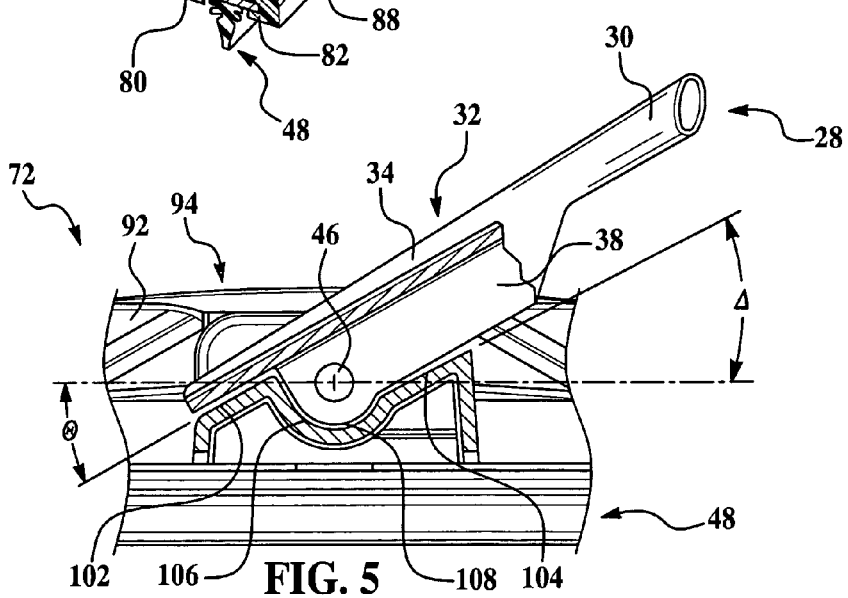
FIG. 5 is perspective view of the wiper arm and wiper assembly in accordance with the present invention where a portion of the wiper arm is shown in cut-away, cross-sectional view.

Referring specifically to FIGS. 2 and 5, the elongate body 28 includes an upper surface 30 adapted to receive the application of a downward force from air current flowing over the wiper arm 22. More specifically, the elongate body 28 is disposed along an inclined plane relative to the primary direction of air current to maximize the downward force applied to the upper surface 30 and minimize the effect of air current traveling under the elongate body 28, thereby reducing the likelihood of wind lift of the wiper assembly 24 during operation. As shown in FIG. 5, the elongate body 28 includes a substantially elliptical cross-section to provide aerodynamic properties that improve resistance to wind lift during movement across the windshield 18. However, those having ordinary skill in the art will appreciate that the elongate body 28 may include other cross-sectional profiles. By way of example, the elongate body 28 may include a solid or hollow core cross-sectional profile. Further by way of example, the elongate body 28 may include a circular, rectangular, or box-like cross-sectional profile.

Figure 3:
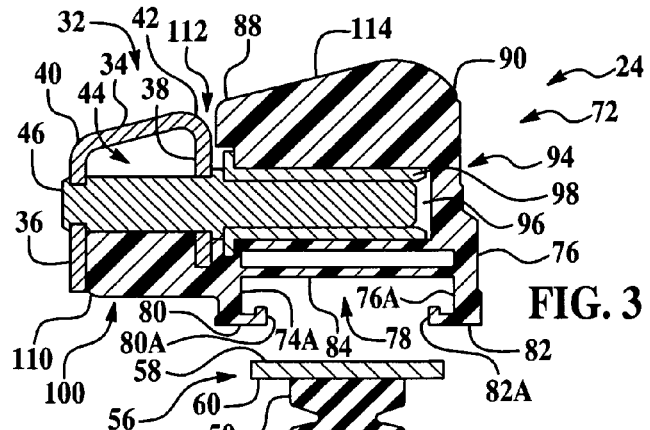
FIG. 3 is a cross-sectional view of the wiper arm and wiper assembly in accordance with the present invention.

As shown throughout the Figures, the wiper arm 22 of the present invention further includes an attachment member, generally indicated at 32. The attachment member is operatively attached to the elongate body 28 opposite the pivot end 26 and is adapted to releasably engage a wiper assembly 24. Referring specifically to FIGS. 2-5, the attachment member 32 is integrally attached to the elongate body 28 and includes a deck 34 that extends axially from the elongate body 28 and a wall plate 36 that depends from the deck 34. The attachment member 32 further includes a tab 38 that depends from the deck 34 in a manner substantially parallel to the wall plate 36. The deck 34 and wall plate 36 cooperate to define a leading edge 40 while the deck 34 and tab 38 cooperate to define a trailing edge 42. As shown in FIG. 3, the deck 34 extends from the leading edge 40 toward the trailing edge 42 along an inclined plane to maximize downward force of air current applied to the deck 34, thereby reducing the likelihood of wind lift of a wiper assembly 24 during operational movement across the windshield 18. The deck 34 further cooperates with the wall plate 36 and tab 38 to define a channel, generally indicated at 44. The channel 44 is adapted to receive a portion of a wiper assembly 24, as will be described in greater detail below.

Figure 4:
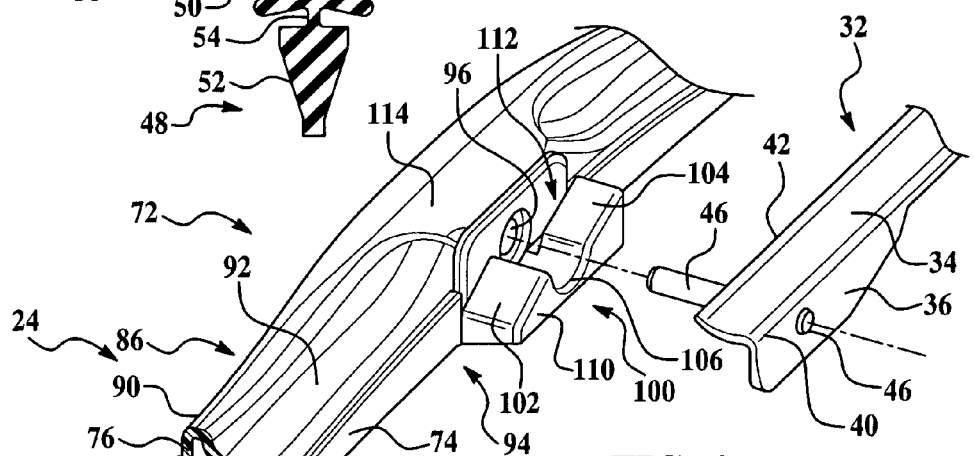
FIG. 4 is a partial fragmentary view of the wiper arm and wiper assembly in accordance with the present invention.

Referring back to FIGS. 3-5, the attachment member 32 further includes a pin 46 that extends transversely relative to the tab 38 and wall plate 36. The transversely extending pin 46 is adapted to operatively engage a portion of the wiper assembly 24 and provide an axis about which the wiper assembly 24 may be rotated during installation, as will be described in greater detail below. As shown in FIGS. 3 and 4, the transversely extending pin 46 is operatively attached to the wall plate 36 and extends through the tab 38 to provide increased rigidity. However, the transversely extending pin 46 may be operatively attached exclusively to the tab 38 as shown in FIG. 5.

It should be appreciated that the wiper arm 22 may be constructed from any rigid material such as metal or plastic and manufactured via any commercially available process such as stamping, casting, or injection molding, and as such, the transversely extending pin 46 may be wholly integrated within a portion of the attachment member 32 during the manufacturing process. Alternatively, the transversely extending pin 46 may be attached to a portion of the attachment member 32 in a subsequent manufacturing process such as welding or riveting. To provide for the inclined plane of the upper surface 30 of the elongate body 28, the wiper arm 22 of the present invention is preferably constructed from steel and manufactured via stamping, where the transversely extending pin 46 is attached to the attachment member 32 in a subsequent manufacturing step.

With continuing reference to FIGS. 2-5, the wiper system 20 includes a wiper assembly 24 having a wiping element, generally indicated at 48. The wiping element 48 is adapted to contact the surface of the vehicle 10 to be wiped, namely the windshield 18 and includes an upper section 50 and a lower section 52 that are segmented by a longitudinally extending partition 54. The partition 54 provides flexibility between the upper section 50 and lower section 52 during operational movement of the wiper assembly 24 across the surface to be wiped. The upper section 50 is adapted to facilitate attachment to additional components of the wiper assembly 24, as described in greater detail below. The wiping element 48 includes a predetermined length corresponding to particular application. It should be appreciated that the wiping element 48 is constructed from a flexible rubber material but other suitable materials may be employed without departing from the scope of the invention. By way of example, the wiping element 48 may be constructed from silicone. The wiping element 48 is typically manufactured through an extrusion process, which enables the length of the wiping element 48 to be easily adjusted without a substantial increase to manufacturing expense. However, those having ordinary skill in the art will appreciate that any commercially available manufacturing process such as injection molding may also be employed.

Referring specifically to FIGS. 2-4, the windshield wiper assembly 24 further includes an elongated beam, generally indicated at 56, that is operatively attached to the wiping element 48. The elongated beam 56 includes a super-surface 58 and a subsurface 60 that extend between first and second longitudinal ends 62 and 64, respectively. The elongated beam 56 is constructed from a resiliently flexible material, such as spring steel or a polymer, and is adapted to apply force from an intermediate position between the first and second longitudinal ends 62 and 64 to the first and second longitudinal ends 62 and 64. More specifically, the elongated beam 56 receives force from the spring-loaded wiper arm 22 at an intermediate position and distributes this force across the span of the elongated beam 56 toward the first and second longitudinal ends 62 and 64. To that end, the elongated beam 56 is curved longitudinally with a predetermined radius of curvature parallel to the plane of curvature of the windshield 18 and is sometimes referred to in the related art as a "free form" radius of curvature (hereinafter "windshield curvature"). Accordingly, the curvature of the elongated beam 56 may be symmetrical or asymmetrical depending on the force requirements and the contour of the windshield 18. The flexible, free form, pre-curved beam straightens out when the wiper arm 22 applies a force thereto to flatten the beam and directs the wiring element 48 to contact the windshield 18. Thus, the elongated beam 56 includes a free-form curvature that ensures force distribution on windshields 18 having various curvatures that effects proper wrapping about the windshield 18.

As shown in FIG. 3, the elongated beam 56 has a substantially constant width and may have a constant thickness throughout the length between the first and second longitudinal ends 62 and 64. The constant width and thickness are adapted to provide high lateral and torsional stiffness to avoid lateral and torsional deflection, which causes the wiping element 48 to stick/slip ("chatter") on the windshield 18 during operation. Thus, the cross-section of the elongated beam 56 has a generally rectangular outer profile which makes the elongated beam 56 easier to manufacture. More specifically, where the elongated beam 56 is constructed from metal, such as spring steel, the tools and machinery used to manufacture the elongated beam 56 are less complicated than that required to manufacture elongated beams 56 having varying widths and/or thicknesses. Furthermore, where the elongated beam 56 is constructed from a polymer, such as a thermoplastic elastomer, the tools and extrusion process machinery are also less complicated than those employed to manufacture elongated beams 56 having varying widths and/or thicknesses. However, those having ordinary skill in the art will appreciate that the elongated beam 56 of the present invention may include a varying thickness and/or width without departing from the scope of the invention. By way of example, the width and/or thickness of the elongated beam 56 may taper linearly from the beam center, sinusoidally, parabolically, or asymmetrically. Additionally, the elongated beam 56 is illustrated throughout the figures as a single, integral piece of material such that it defines a consolidated cross-section. However, those having ordinary skill in the art will appreciate that the elongated beam 56 may be formed into a single piece by a plurality of laminates.

The wiper assembly 24 includes additional structure to improve wind lift resistance, as will be described in greater detail below. More specifically, and as best shown in FIG. 2, the wiper assembly 24 includes spoilers 66 disposed between an intermediate position and the longitudinal ends 62 and 64 of the elongated beam 56 that act to reduce the likelihood of wind lift by efficiently utilizing airflow to generate downward force on to the wiper assembly 24. The spoilers 66 are substantially solid in cross-section and taper inwardly from the elongated beam 56 toward a terminal point 68 to define a profile that is slightly contoured (FIG. 2). The spoilers 66 are manufactured from a thermoplastic material, as described above relative to the wiping element 48, and are operatively attached to the super-surface 58 of the elongated beam 56. Those having ordinary skill in the art will appreciate that the spoilers 66 may be attached to the elongated beam 56 by an adhesive, ultrasonic welding, or by structure, such as tongue and groove or a passage located within the spoilers 66.

Further referring to FIG. 2 the wiper assembly 24 of the present invention may further include a pair of end caps, generally indicated at 70. The end caps 70 are adapted to operatively engage the longitudinal ends 62, 64 of the elongated beam 56. The end caps 70 include a profile that substantially mimics the contours of the spoilers 66 to maintain the wind lift characteristics of the wiper assembly 24 and to provide an increased aesthetic value. The end caps 70 extend beyond the longitudinal ends 62, 64 of the elongated beam 56 to facilitate contact between the outer extremities of the wiping element 48 and the surface to be wiped.

The wiper assembly 24 further includes a carrier, generally indicated at 72, that is disposed along an intermediate position between the first and second longitudinal ends 62, 64 of the elongated beam 56. Contrary to conventional beam blade wiper assemblies, which include a small contact point through which force from the wiper arm is distributed, the carrier 72 of the present invention broadens the initial point at which force is applied from the wiper arm 22 to the elongated beam 56. In this manner, the downward force from the wiper arm 22 is distributed with more efficiency to the longitudinal ends 62 and 64 of the elongated beam 56, thereby reducing the likelihood of wind lift and improving wiping action.

Referring to FIGS. 3-5, the carrier 72 includes opposed first and second sidewalls 74 and 76, respectively, that cooperate to define a track, generally indicated at 78, to operatively receive the elongate beam 56. More specifically, the first and second sidewalls 74, 76 each include an interior surface, 74A and 76A, respectively, having at least two transversely extending tangs 80, 82 that engage the subsurface 60 of the elongated beam 56. Furthermore, at least one of the tangs 80, 82 on each of the interior surfaces 74A, 76A further include a flange 80A, 82A that restricts the lateral movement of the elongated beam 56 relative to the carrier 72. It should be appreciated that the elongated beam 56 includes notches or apertures (not shown) that are adapted to receive the flanges 80A, 82A. It should further be appreciated that the tangs 80, 82 are operatively disposed adjacent to the terminal ends of the carrier 72 to accommodate the resiliency of the elongated beam 56. Additionally, the carrier 72 includes at least two bridges 84 disposed above the tangs 80, 82. The bridges 84 operatively connect the interior surfaces 74A, 76A and prevent vertical movement of the elongated beam 56 relative to the tangs 80, 82. In this manner, the elongated beam 56 is retained by the carrier 72, but remains able to flex in response to the curvature of the surface to be wiped. Those having ordinary skill in the art will appreciate that the elongated beam 56 may be operatively attached to the carrier 72 by several methods other than as described above. By way of example, the carrier 72 may be glued, riveted or spot welded to the elongated beam 56.

Referring specifically to FIG. 4, the carrier 72 further includes a top surface, generally indicated at 86, that is disposed between the first and second sidewalls 74 and 76, respectively. The top surface 86 cooperates with the first sidewall 74 to define a facing edge 88 and further cooperates with the second sidewall 76 to define a terminal edge 90. The top surface 86 is contoured to define an airfoil 92 between the facing edge 88 and the terminal edge 90 that is adapted to reduce the likelihood of wind lift during operational movement across a surface to be wiped. More specifically, the airfoil 92 defined within the carrier 72 substantially mimics the profile of the spoilers 66 described above. Those having ordinary skill in the art will appreciate that while the top surface 86 is contoured to define an airfoil 92 to reduce the likelihood of wind lift, that top surface 86 may include other undulation to accomplish the intended objective. By way of example, the top surface 86 may extend from the facing edge 88 toward the terminal edge 90 along a substantially planar incline in a manner that efficiently utilizes airflow to increase the downward force on the wiper assembly 24 to reduce the likelihood of wind lift.

Referring to FIGS. 3 and 4, the carrier 72 further includes a coupler, generally indicated at 94. The coupler 94 is integrated within the first sidewall 74 and is adapted to facilitate releasable connection with the attachment member 32 of the wiper arm 22. The coupler 94 includes a bore 96 disposed within the first sidewall 74 that is adapted to receive the transversely extending pin 46 of the attachment member 32 of a wiper arm 22. More specifically, the bore 96 provides a surface about which the transversely extending pin 46 rotates during installation of the wiper assembly 24 to the wiper arm 22, as described in greater detail below. As shown in FIG. 3, the coupler 94 may optionally include a sleeve 98 disposed within the bore 96. The sleeve 98 is adapted to provide improved wear and rotational properties relative to the rotation of the pin 46. Those having ordinary skill in the art will appreciate that while the coupler 94 shown in FIG. 3 includes a sleeve 98 disposed within the bore 96, the present invention is not limited to the requirement of such structure.

The coupler 94 further includes a saddle, generally indicated at 100. The saddle 100 extends transversely from the first sidewall 74 and is adapted to operatively engage the attachment member 32 of a wiper arm 22. More specifically, the saddle 100 is adapted to be operatively disposed within the channel 44 of the attachment member 32 when the wiper assembly 24 is properly engaged to a wiper arm 22 (FIG. 3).

During inspection of the windshield 18 or replacement of a worn wiper assembly 24, the wiper arm 22 is often pivoted about the pivot end 26, such that the elongate body 28 is elevated from an initial position substantially parallel to the plane of a windshield 18 to an elevated position that is substantially perpendicular relative to the plane of a windshield 18. In the elevated position, conventional beam blade wiper assemblies rotate about a pin such that a wiping element is substantially inverted relative to the windshield 18. However, conventional beam blade wiper assemblies do not return from the inverted state when the wiper arm is lowered back toward its initial position. Thus, when the user attempts to re-establish contact with the windshield 18, the wiping element remains inverted or at least perpendicular relative to the windshield 18. This inverted orientation between wiper assembly and windshield 18 can result in damage to the wiper assembly, wiper arm, wiper system linkage and drive assembly as well as the windshield 18.

Accordingly, the present invention includes first and second guide surfaces 102 and 104, respectively, disposed on the saddle 100. The guide surfaces 102, 104 are adapted to limit the rotational movement of the wiper assembly 24 about the transversely extending pin 46 of a wiper arm 22. The first guide surface 102 abuts the first sidewall 74 adjacent to the bore 96 and extends along a predetermined angle substantially toward the bore 96. Thus, the first guide surface 102 provides a limit to prevent excess rotation of the wiper assembly 24 relative to a wiper arm 22 during assembly and disassembly. More specifically, the first guide surface 102 is adapted to contact a portion of the channel 44 opposite the deck 34 to prevent rotation of the wiper assembly 24 greater than angle $\Theta$. In one embodiment, angle $\Theta$ represents an angle no greater than thirty-five degrees below the horizontal axis of the transversely extending pin 46. However, in another embodiment, an angle $\Theta$ is no greater than thirty degrees below the horizontal axis of the transversely extending pin 46. The second guide surface 104 is disposed adjacent to the first sidewall 74 and extends along a predetermined angle substantially away from the bore 96. Thus, the second guide surface 104 provides a limit to prevent excess rotation of the wiper assembly 24 relative to a wiper arm 22 in a manner opposite to that of the first guide surface 101 during assembly and disassembly. More specifically, the second guide surface 104 is adapted to contact a portion of the channel 44 to prevent rotation of the wiper assembly 24 greater than angle Δ. In one embodiment, angle Δ represents an angle no less than twenty degrees above the horizontal axis of the transversely extending pin 46. However, in another embodiment, an angle Δ is no less than twenty-five degrees above the horizontal axis of the transversely extending pin 46.

The saddle 100 further includes a seat 106 disposed between the first and second guide surfaces 102 and 104, respectively. The seat 106 is adapted to facilitate proper alignment between the bore 96 and the transversely extending pin 46 of the wiper arm 22 during installation of the wiper assembly 24 to a wiper arm 22. More specifically, during installation of the wiper assembly 24, a portion of the tab 38 contacts the seat 106 prior to the transversely extending pin 46 engaging the bore 96. Accordingly, the tab 38 of the attachment member 32 includes a guide edge 108 corresponding to the contour of the seat 106, such that the seat 106 and guide edge 108 cooperate to properly align the pin 46 of the wiper arm 22 with the bore 96 of the wiper assembly 24.

Moreover, the saddle 100 further includes a fascia 110 that is adapted to contact a portion of the wall plate 36 (FIG. 3) to indicate that the pin 46 is properly disposed within the bore 90. Referring specifically to FIG. 4, the saddle 100 further includes a slot 112 disposed substantially between the first sidewall 74 and the second guide surface 102. The slot 112 is adapted to receive a portion of the tab 38 of a wiper arm attachment member 32. More specifically, when a portion of the wall plate 36 contacts the fascia 110, the wiper assembly 24 may be rotated about the transversely extending pin 46 of a wiper arm 22 such that a portion of the tab 38 is operatively disposed within the slot 112, thereby releasably locking the wiper assembly 24 to the wiper arm 22. Accordingly, the structure of the coupler 94, specifically the first and second guide surfaces 102, 104, slot 112 and bore 96, in cooperation with the structure of the attachment member 32, specifically the tab 38, channel 44 and pin 46, prevents over-rotation of the wiper assembly 24 relative to the wiper arm 22, thereby reducing the likelihood of damage to the windshield 18 and components of the wiper system 20.

Furthermore, in addition to the above-identified components of the wiper assembly 24 to reduce the likelihood of wind lift, the top surface 86 further includes a substantially planar section 114 adjacent to the coupler 94. The planar section 114 extends from the facing edge 88 toward the terminal edge 90 along a predetermined angle to further reduce the likelihood of wind lift. More specifically, and as shown in FIG. 3, the substantially planar section 114 of the top surface 86 extends substantially the same angle as the deck 34 to maximize downward force applied to the coupler-attachment member interface, thereby further reducing the likelihood of wind lift during operational movement across a surface to be wiped. Those having ordinary skill in the art will appreciate that while the carrier 72 is shown in connection with a beam blade-style wiper assembly 24, the carrier 72 of the present invention may also be employed in connection with a tournament-style wiper assembly. By way of example, the carrier 72 may be operatively attached to the superstructure of a tournament-style wiper assembly and adapted to releasably connect a tournament-style wiper assembly to the wiper arm attachment member 32 of the present invention, as described above.

The wiper system 20 of the present invention provides a beam blade wiper assembly 24 that releasably connects to a pin-style wiper arm 22, where the wiper arm 22 includes an elongate body 28 and an attachment member 32 having an angled deck 34. Accordingly, the wiper system 20 of the present invention provides improved wind lift resistance and downward force to the beam blade wiper assembly 24. The wiper system 20 of the present invention includes a wiper assembly 24 having a carrier 72 that includes a contoured top surface 86 that defines an airfoil 92 and inclined planar section to efficiently utilize air current to maximize downward force applied to a wiper assembly 24. Accordingly, the wiper system 20 of the present invention reduces the likelihood of wind lift to a beam blade wiper assembly 24 during operational movement across a surface to be wiped. The wiper system 20 of the present invention further includes a beam blade wiper assembly 24 having a coupler 94 that includes a saddle 100 that prevents excess rotation of the wiper assembly 24 about the transversely extending pin 46 of a wiper arm 22. Accordingly, the wiper system 20 of the present invention reduces the likelihood of damage to the surface to be wiped as well as components of a wiper system 20 during maintenance, inspection or replacement of the surface to be wiped or a beam blade wiper assembly 24.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A wiper assembly for use in connection with a wiper arm having an attachment member including a channel and a transversely extending pin, said wiper assembly comprising:

a wiping element adapted to contact a surface to be wiped;

an elongated beam operatively attached to said wiping element and having first and second longitudinal ends and defining a longitudinal axis, said beam being of a resiliently flexible material to apply a force from an intermediate position between said first and second longitudinal ends to said first and second longitudinal ends to facilitate contact between said wiping element and the surface to be wiped;

a carrier operatively disposed at an intermediate position between said first and second longitudinal ends of said elongated beam and adapted to facilitate releasable connection to a wiper arm, said carrier having opposed first and second sidewalls that cooperate to define a track therebetween to operatively receive said elongate beam; and wherein said carrier further includes a coupler integrated within said first sidewall to facilitate releasable connection with a wiper arm, said coupler having a bore adapted to operatively receive a transversely extending pin of a wiper arm and saddle extending outwardly from said first sidewall and laterally spaced from said longitudinal axis, said saddle adapted to operatively engage an attachment member of a wiper arm, said saddle including first and second guide surfaces adapted to limit the rotational movement of said wiper assembly relative to a wiper arm during releasable connection thereto.

2. The wiper assembly as set forth in claim 1 wherein said first guide surface abuts said first sidewall adjacent to said bore, and extends along a predetermined angle substantially toward said bore to prevent excess rotation of said wiper assembly relative to a wiper arm during releasable connection thereto.

3. The wiper assembly as set forth in claim 1 wherein said second guide surface is disposed adjacent to said first sidewall and extends along a predetermined angle substantially away from said bore to prevent excess rotation of said wiper assembly relative to a wiper arm to facilitate releasable connection thereto.

4. The wiper assembly as set forth in claim 1 wherein said saddle further includes a slot disposed substantially between said first sidewall and said second guide surface, said slot is adapted to receive a portion of a wiper arm attachment member to releasably lock said wiper assembly to a wiper arm.

5. The wiper assembly as set forth in claim 4 wherein said saddle further includes a fascia that is adapted to contact a portion of a wiper arm attachment member to indicate that said slot may operatively receive a portion of an engaging member of a wiper arm.

6. The wiper assembly as set forth in claim 1 wherein said carrier further includes a contoured top surface disposed between said first and second sidewalls, said contoured top surface cooperates with said first sidewall to define a facing edge and further cooperates with said second sidewall to define a terminal edge wherein said contoured top surface defines an airfoil between said facing edge and said terminal edge that is adapted to reduce the likelihood of wind lift during operational movement across a surface to be wiped.

7. The wiper assembly as set forth in claim 6 wherein said contoured top surface includes a substantially planar section adjacent to said coupler that extends from said facing edge toward said terminal edge along a predetermined angle to maximize downward force of air current directed toward the interface between said coupler and a wiper arm attachment member to reduce the likelihood of wind lift during operational movement of said wiper assembly across a surface to be wiped.

8. The wiper assembly as set forth in claim 1 wherein said first and second sidewalls each include an interior surface having at least two transversely extending tangs adapted to facilitate attachment between said carrier and said elongate beam.

9. The wiper assembly as set forth in claim 8 wherein said at least one of said tangs disposed on each of said interior surfaces includes a flange adapted to prevent lateral movement of said elongate beam relative to said carrier.

10. The wiper assembly as set forth in claim 1 wherein said coupler further includes a sleeve operatively disposed within said bore that is adapted to receive a transversely extending pin of a wiper arm to improve wear and rotational properties within said bore.

11. The wiper assembly as set forth in claim 1 wherein said saddle further includes a seat disposed between said first and second guide surfaces, said seat is adapted to facilitate proper alignment between said bore and a transversely extending pin of a wiper arm.

12. A wiper arm and wiper assembly for use in connection with a wiper system, said wiper arm and wiper assembly comprising:

a wiper arm having a pivot end operatively engaged to a drive assembly of a wiper system, an attachment member and an elongate body disposed between said attachment member and said pivot end, said attachment member including a deck extending axially from said elongate body, a tab and a wall plate, said tab and said wall plate depending from said deck substantially parallel to each other and cooperate with said deck to define a channel, said attachment member further including a transversely extending pin relative to said tab;

a wiper assembly including a wiping element adapted to contact a surface to be wiped, an elongated beam operatively attached to said wiping element and a carrier adapted to facilitate releasable connection to said wiper arm, said carrier having opposed first and second sidewalls that cooperate to define a track to operatively receive a portion of said elongate beam and a coupler integrated within said first sidewall to releasably engage said attachment member, said coupler having a bore adapted to operatively receive said transversely extending pin and saddle adapted to be operatively disposed within said channel, said saddle including first and second guide surfaces adapted to limit the rotational movement of said wiper assembly relative to said wiper arm during releasable connection thereto; and wherein said deck cooperates with said wall plate to define a leading edge and further cooperates with said tab to define a trailing edge, said deck extending from said leading edge toward said trailing edge along an inclined plane relative to the horizontal axis of said transversely extending pin to maximize downward force of air current applied to said deck to reduce the likelihood of wind lift of said wiper assembly during operational movement across a surface to be wiped.

13. The wiper arm and wiper assembly as set forth in claim 12 wherein said elongate body includes a substantially elliptical cross-section adapted to maximize the downward force and minimize the upward force of air current applied to said wiper arm movement across a surface to be wiped to reduce the likelihood of wind lift on said wiper assembly.

14. The wiper arm and wiper assembly as set forth in claim 12 wherein said elongated beam includes first and second longitudinal ends and is of a resiliently flexible material that is adapted to apply a force received from said wiper arm through said carrier to said longitudinal ends to facilitate contact between said wiping element and a surface to be wiped.

15. The wiper arm and wiper assembly as set forth in claim 12 wherein said first guide surface abuts said first sidewall adjacent to said bore and extends along a predetermined angle substantially toward said bore, said first guide surface adapted to contact a portion of said deck to prevent excess rotation of said wiper assembly relative to said wiper arm during releasable connection thereto.

16. The wiper arm and wiper assembly as set forth in claim 12 wherein said second guide surface is disposed adjacent to said first sidewall and extends along a predetermined angle substantially away from said bore, said second guide surface adapted to contact a portion of said channel to prevent excess rotation of said wiper assembly relative to said wiper arm during releasable connection thereto.

17. The wiper arm and wiper assembly as set forth in claim 12 wherein said saddle further includes a slot disposed substantially between said first sidewall and said second guide surface, said slot is adapted to receive said tab to releasably lock said wiper assembly to said wiper arm.

18. The wiper arm and wiper assembly as set forth in claim 17 wherein said saddle further includes a fascia that is adapted to contact a portion of said wall plate to indicate that said wiper assembly may be rotated about said transversely extending pin to operatively dispose said tab within said slot.

19. The wiper arm and wiper assembly as set forth in claim 12 wherein said carrier further includes a contoured top surface disposed between said first and second sidewalls, said contoured top surface cooperating with said first sidewall to define a facing edge and further cooperating with said second sidewall to define a terminal edge, said contoured top surface defining an airfoil between said facing edge and said terminal edge that is adapted to reduce the likelihood of wind lift during operational movement across a surface to be wiped.

20. The wiper arm and wiper assembly as set forth in claim 19 wherein said contoured top surface includes a substantially planar section adjacent to said coupler that extends from said facing edge toward said terminal edge along a predetermined angle to maximize downward force of air current directed toward the interface between said coupler and said deck to reduce the likelihood of wind lift during operational movement of said wiper assembly across a surface to be wiped.

21. The wiper arm and wiper assembly as set forth in claim 12 wherein said first and second sidewalls each include an interior surface having at least two tangs extending transversely therefrom, said tangs adapted to facilitate attachment between said carrier and said elongate beam.

22. The wiper arm and wiper assembly as set forth in claim 21 wherein at least one of said tangs disposed on each of said interior surfaces includes a flange adapted to prevent lateral movement of said elongate beam relative to said carrier.

23. The wiper arm and wiper assembly as set forth in claim 12 wherein said coupler further includes a sleeve operatively disposed within said bore that is adapted to provide a contact surface about which said transversely extending pin may rotate, said sleeve adapted to provide improved wear and friction resistance within said bore.

24. The wiper arm and wiper assembly as set forth in claim 12 wherein said saddle further includes a seat disposed between said first and second guide surfaces, said seat adapted to facilitate proper alignment between said bore and a transversely extending pin of a wiper arm.

25. The wiper arm and wiper assembly as set forth in claim 24 wherein said tab includes a guide edge adapted to operatively contact said seat to properly align said transversely extending pin with said bore to facilitate releasable connection therebetween.

26. The wiper arm and wiper assembly as set forth in claim 12 wherein said transversely extending pin is operatively attached to said wall plate and extends through said tab to provide an axis about which said wiper assembly rotates during releasable attachment between said wiper arm and said wiper assembly.

27. The wiper arm and wiper assembly as set forth in claim 12 wherein said transversely extending pin is operatively attached to said tab to provide an axis about which a wiper assembly may be rotated to provide releasable attachment between said wiper arm and a wiper assembly.

* * * * *